(12) United States Patent
Ai et al.

(10) Patent No.: US 7,815,535 B2
(45) Date of Patent: Oct. 19, 2010

(54) COMPACT AXIAL FLUX MOTOR DRIVE

(75) Inventors: Xiaolan Ai, Massillon, OH (US);
Nicholas J. Sertell, Uniontown, OH (US)

(73) Assignee: The Timken Company, Canton, OH (US)

( * ) Notice: Subject to any disclaimer, the term of this patent is extended or adjusted under 35 U.S.C. 154(b) by 304 days.

(21) Appl. No.: 12/064,136

(22) PCT Filed: Sep. 7, 2006

(86) PCT No.: PCT/US2006/034746
§ 371 (c)(1),
(2), (4) Date: Feb. 19, 2008

(87) PCT Pub. No.: WO2007/030558
PCT Pub. Date: Mar. 15, 2007

(65) Prior Publication Data
US 2008/0236318 A1 Oct. 2, 2008

Related U.S. Application Data

(60) Provisional application No. 60/715,498, filed on Sep. 9, 2005.

(51) Int. Cl.
*F16H 48/06* (2006.01)
(52) U.S. Cl. .................................................. 475/149
(58) Field of Classification Search ................... 475/149
See application file for complete search history.

(56) References Cited

U.S. PATENT DOCUMENTS

| 5,355,743 | A | 10/1994 | Tesar |
| 5,704,864 | A * | 1/1998 | Yanagisawa ................. 475/149 |
| 6,727,614 | B2 * | 4/2004 | Neubauer et al. ......... 310/75 R |
| 6,922,004 | B2 | 7/2005 | Hashimoto et al. |
| 7,052,428 | B2 | 5/2006 | Bolz |
| 7,081,062 | B2 * | 7/2006 | Tesar .......................... 475/163 |
| 2008/0202832 | A1 * | 8/2008 | Ai .............................. 180/65.5 |

FOREIGN PATENT DOCUMENTS

| DE | 4412898 A1 | 10/1995 |
| EP | 0388207 A2 | 9/1990 |
| JP | 07147753 A | 6/1995 |
| WO | WO 03/078863 | 9/2003 |

OTHER PUBLICATIONS

Kartik Sitapati et al: "Performance Comparisons of Radial and Axial Field, Permanent-Magnet, Brushless Machines" IEEE Transactions on Industry Applications, IEEE Service Center, Piscataway, NJ, US, vol. 37, No. 5, Sep. 2001, XP011023056; ISSN: 0093-9994; p. 1225, col. 1.

* cited by examiner

*Primary Examiner*—Dirk Wright
(74) *Attorney, Agent, or Firm*—Polster, Lieder, Woodruff & Lucchesi, L.C.

(57) ABSTRACT

A drive (A) for imparting rotation about an axis (X) includes an axial flux motor (4) having a stator (38) and a rotor (44), an output drive element (8), an epicyclic gear system (6) located between the rotor of the axial flux motor and the drive element. The gear system is located within and surrounded by the motor, thus rendering the drive highly compact along its axis.

12 Claims, 4 Drawing Sheets

US 7,815,535 B2

COMPACT AXIAL FLUX MOTOR DRIVE

RELATED APPLICATION

This application derives and claims priority from U.S. provisional application 60/715,498 filed 9 Sep. 2005, and from international application PCT/US2006/034746 (WO 2007/030558) filed 7 Sep. 2006, both of which are incorporated herein by reference.

TECHNICAL FIELD

This invention relates in general to electric drives and more particularly to an axial flux motor drive that is highly compact.

BACKGROUND ART

Most electric motors, being of the radial flux variety, occupy a good measure of space along their axes of rotation. Generally speaking, their axial dimensions are greater than their radial dimensions. Their axial dimensions become even greater when they are coupled to gear boxes, as with so-called "gear motors", to increase torque.

Axial flux motors dimensionally possess the opposite characteristics. They are quite compact axially, but have generally greater radial dimensions than radial flux motors of corresponding power. Even so, an axial flux motor, when coupled with a gear box to increase torque, assumes a greater axial dimension, and this detracts from the compactness of the design.

BEST MODE OF CARRYING OUT THE INVENTION

Figure 1:
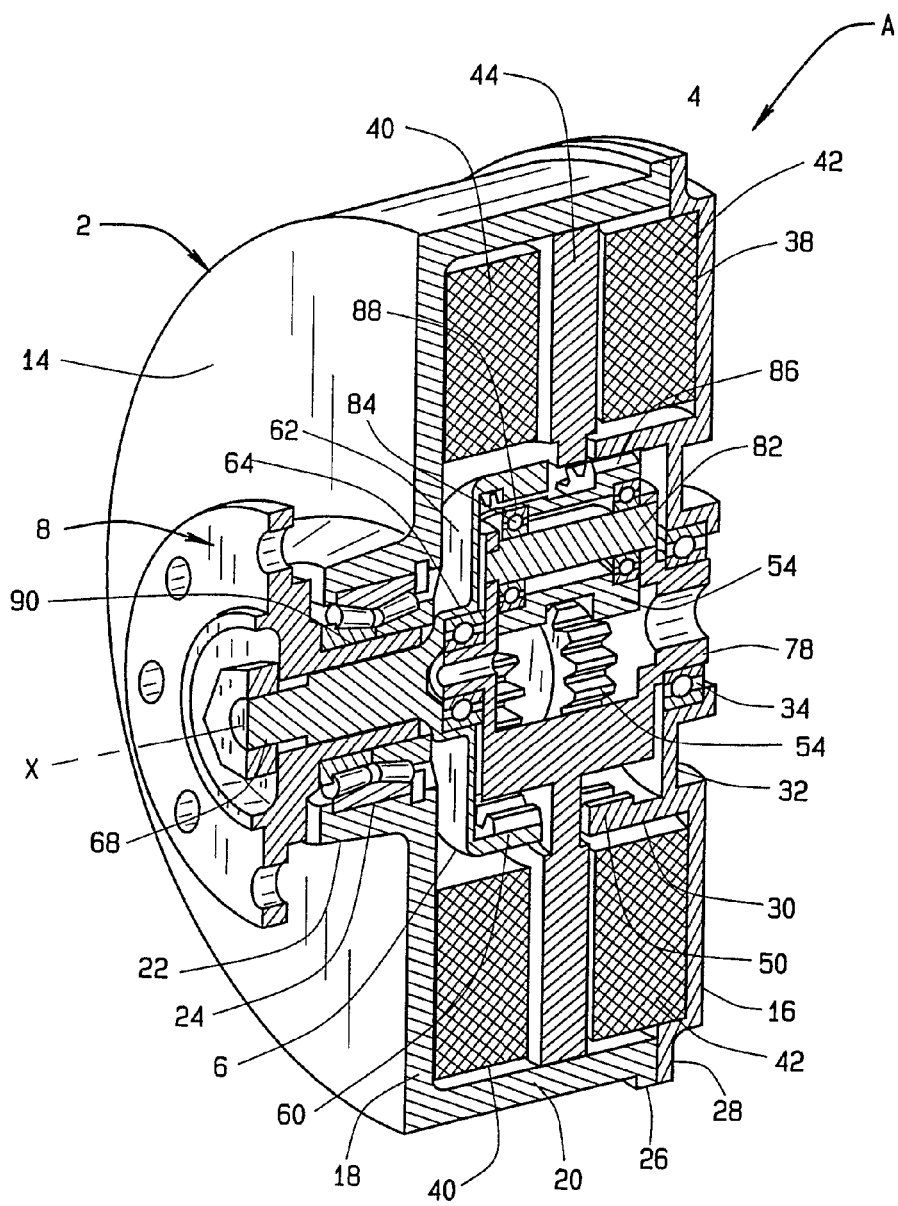
FIG. 1 is a perspective view, partially broken away and in section, of an axial flux motor drive constructed in accordance with and embodying the present invention.

Referring now to the drawings, an axial flux motor drive A (FIG. 1) generates considerable torque about an axis X of rotation, yet is highly compact in the axial direction. Basically, it includes a housing 2, an axial flux motor 4 located within the housing 2, a planetary transmission 6 also located within the housing 2—and within the motor 4 itself—and a drive element or flange 8 located outside the housing 2 where it can be coupled to that which the drive A is designed to power. The motor 4 drives the flange 8, with torque being transferred through the transmission 6 to the flange 8. The transfer results in a reduction in angular velocity and an increase in torque.

Figure 2:
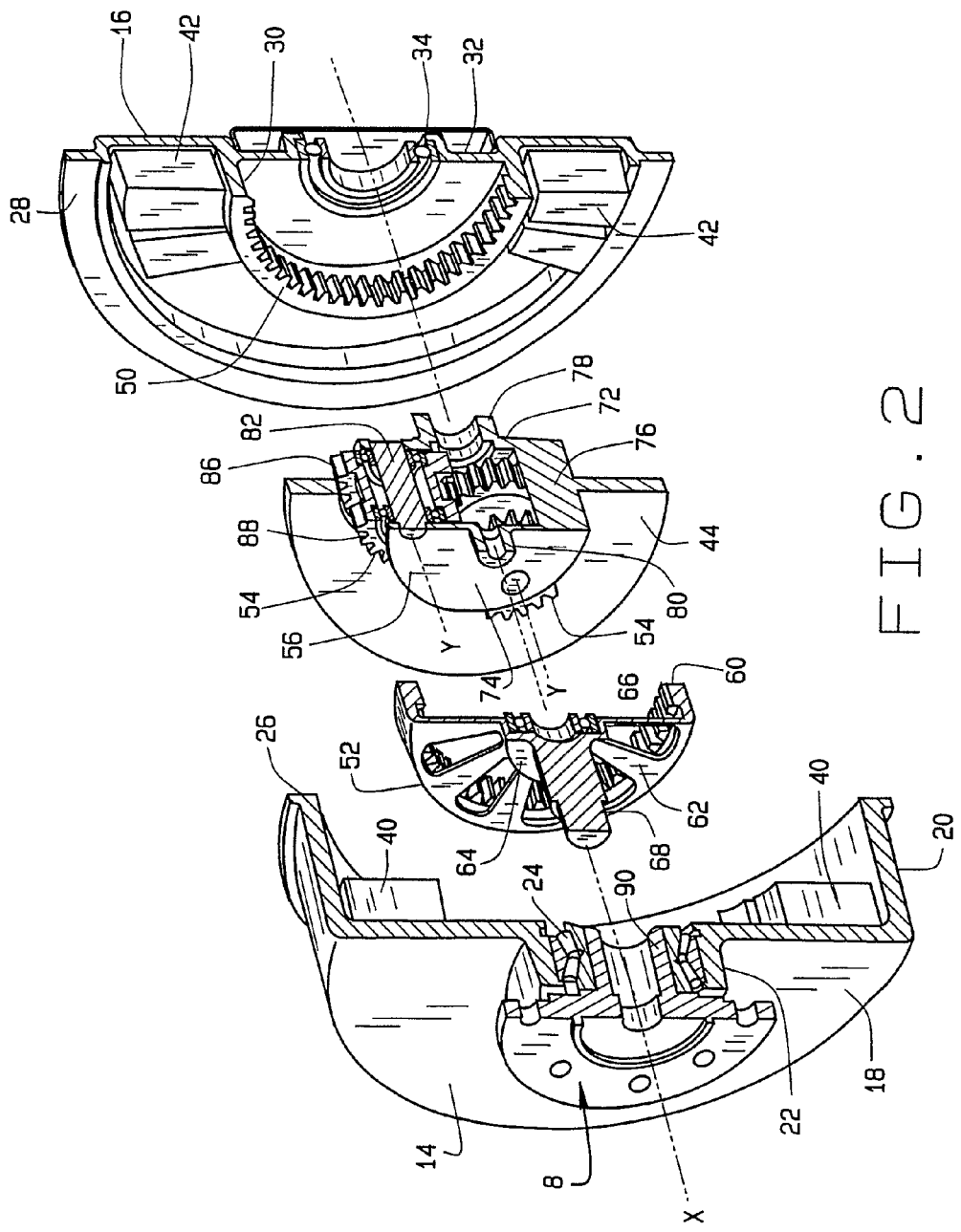
FIG. 2 is an exploded perspective view of the axial flux motor drive.
Figure 3:
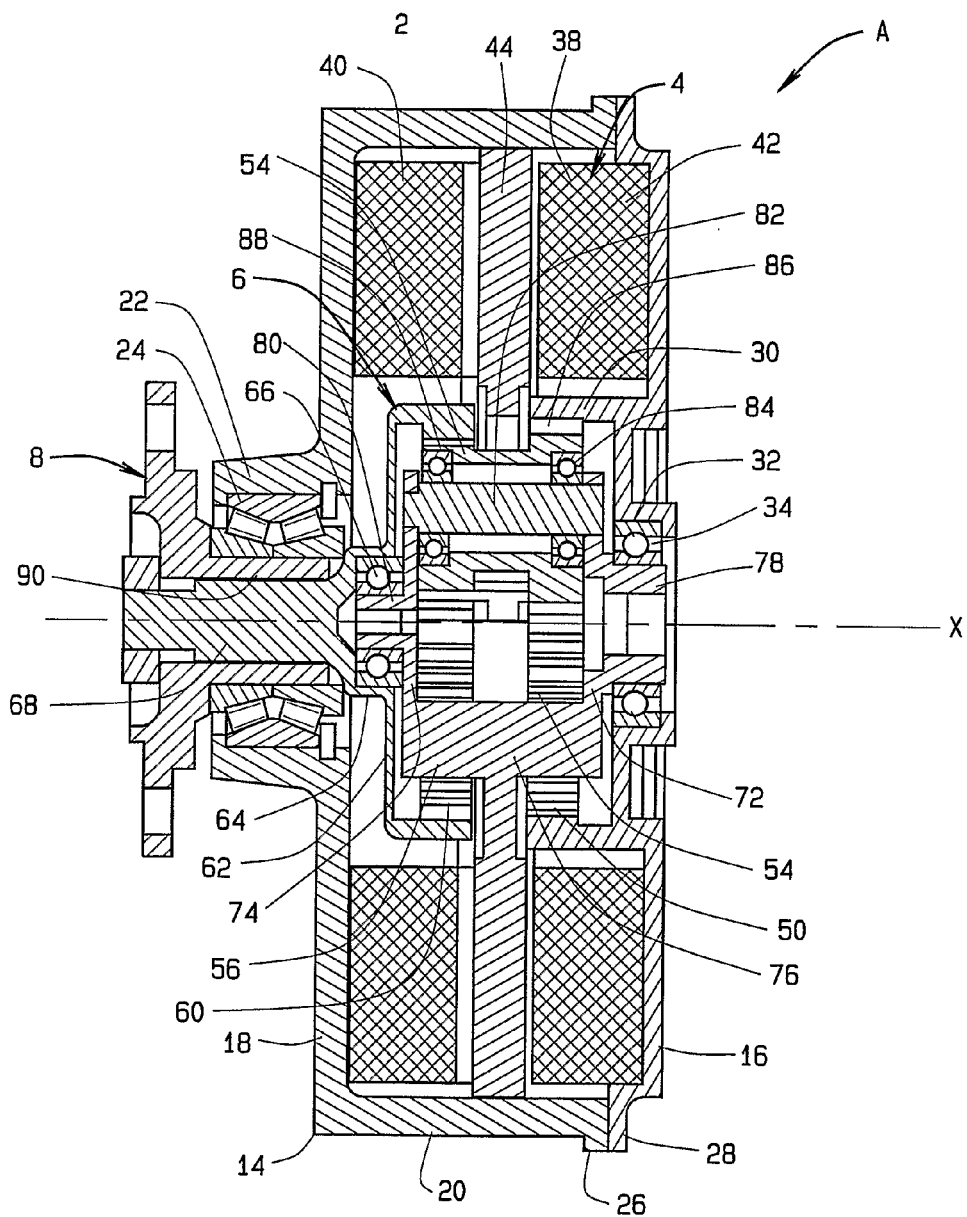
FIG. 3 is a sectional view of the axial flux motor drive.

The housing 2 has (FIGS. 1-3) two sections 14 and 16 that are joined together with screws or other mechanical fasteners to enclose a space that contains both the motor 4 and the transmission 6. The section 14 possesses the general configuration of a drum in that it has a radial wall 18 that leads out to and merges with an axially directed peripheral wall 20. At its center the radial wall 18 has an axially directed sleeve 22 that projects away from the radial wall 18 in the opposite direction. The sleeve 20 supports an antifriction bearing 24 along the axis X. The peripheral wall 20 leads out to a short flange 26.

The section 16 generally assumes the configuration of an end plate, although it is slightly offset at its periphery in the provision of a short flange 28 that fits against the short flange 26 on the peripheral wall 20 of the section 14. Inwardly from its flange 28, the section 14 has an axially directed internal wall 30 that projects into the space enclosed by the housing 2. The internal wall 30 in turn carries a bearing mount 32 that contains an antifriction bearing 34, also located along the axis X. Thus, the housing 2 supports two antifriction bearings 24 and 34, and they establish the axis of the motor 4 and the major axis of the transmission 6, both of which coincide with the axis X. The two sections 14 and 16 are joined firmly together at their abutting flanges 26 and 28.

The motor 4 has (FIGS. 1 & 3) a stator 38 that includes windings 40 and 42 arranged in two arrays circumferentially around the axis X and attached firmly to the housing 2. The windings 40 form one array and lie along the radial wall 18 of the drum-like housing section 14, whereas the windings 42 form the other arrays and lie along the plate-like housing section 16, there being a space between the two arrays of windings 40 and 42. The peripheral wall 20 of the drum-like section 14 surrounds both arrays of windings 40 and 42. The motor 4 also includes a rotor 44 that occupies and rotates in the space between the two arrays of windings 40 and 42. It takes the form of a narrow annular disk that is supported on the transmission 6. The rotor 44 contains permanent magnet segments.

The transmission 6, which is an epicyclic gear system, basically includes (FIGS. 2 & 3) a stationary ring gear 50 on the housing 2 and a rotatable final drive member 52 to which the drive flange 8 is coupled. It also includes planet clusters 54 between and coupling the ring gear 50 and drive member 52, and a planet carrier 56 supporting the planet clusters 54 and establishing axes Y about which they rotate, the axes Y being offset from, yet parallel to, the primary axis X. The annular rotor 44 of the motor 4 is coupled firmly to and rotates the carrier 56, so that the rotor 44 and carrier 56 will rotate in unison at the same angular velocity.

Figure 4:
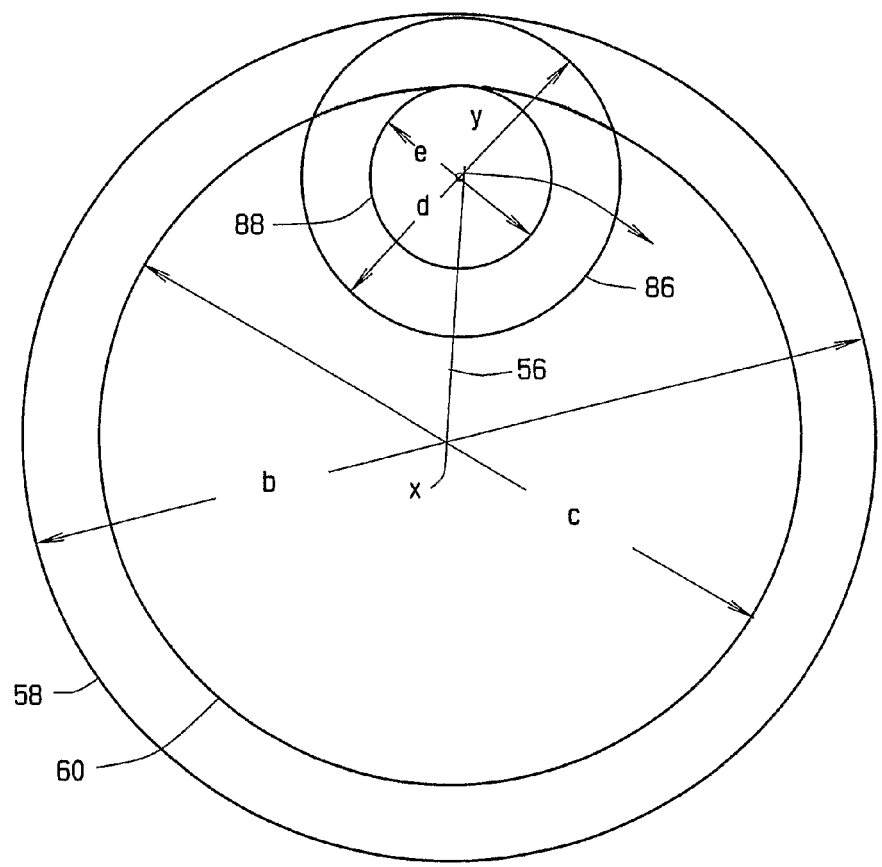
FIG. 4 is a schematic view of the transmission for the axial flux motor drive.

The ring gear 50 is mounted on the axially directed wall 30 of the housing section 16 and may be formed integral with that wall 30. Its axis coincides with the axis X and its teeth are presented inwardly toward the axis X. It has a pitch diameter b (FIG. 4).

The final drive member 52 includes a ring gear 60 that is offset axially with respect to the stationery ring gear 50. Its axis likewise coincides with the axis X and its teeth are likewise presented inwardly toward the axis X. The drive member 52 has a radial wall 62 at one end of its ring gear 60 and it radiates from a hub 64 that contains an antifriction bearing 66. The hub 64 in turn merges into a drive spindle 68 that projects axially along the axis X, its axis likewise coinciding with the axis X. Whereas the ring gear 60 projects axially from the radial wall 62 toward the ring gear 50, the spindle 68 projects axially from the radial wall 62 in the opposite direction. Indeed, it projects through the bearing 24 in the sleeve 22 of the housing 2. The ring gear 60 has a pitch diameter c which is different than the pitch diameter b of the ring gear 50 (FIG. 4).

The carrier 56 lies generally within and between the stationary ring gear 50 and the final drive member 52. It carries the planet clusters 54 as well as the disk-like rotor 44 of the motor 4. It too rotates about the axis X. The carrier 56 includes spaced apart end walls 72 and 74 connected by several bridges 76, thus providing cavities for accommodating the planet clusters 54. The end wall 72 lies within the axially directed wall 30 of the housing 2 and at its center has a stub shaft 78 that is received in the bearing 34 of the housing 2. The other end wall 74 at its center has a stub shaft 80 that is received on the bearing 66 of the drive member 52. The carrier 56 also has pins 82 which are anchored at their ends on the end walls 72 and 74 and span the cavities between those walls 72 and 74. The pins 82 serve as axles on which planet clusters 54 rotate. The annular rotor 44 of the motor 4 projects radially outwardly from the bridges 76 of the carrier 56 and may be formed integral with those bridges 76.

The planet clusters 54 rotate about the offset axes Y of the carrier 56 on the pins 82, there being bearings 84 between each planet cluster 54 and the pin 82 on which it rotates. Thus, the planet clusters 54 are confined to the cavities between the end walls 72 and 74 of the carrier 56. Each planet cluster 54 includes two planet gears 86 and 88 which are united and rotate at the same angular velocity. Each planet gear 86 engages the stationary ring gear 50 on the housing 2. It has a pitch diameter d (FIG. 4). Each planet gear 88 engages the ring gear 60 of the final drive member 52. It has a pitch diameter e (FIG. 4).

The drive spindle 68 of the final drive member 52 projects through the sleeve 22 on the drum-like section 14 of the housing 2 and through the bearing 24 in that sleeve 22. The drive flange 8 has a sleeve 90 that fits over the spindle 68, to which it is coupled with a key or spline, and it is received in the bearing 24 of the housing 2, which is preferably a double row antifriction bearing, so the bearing 24 supports the drive flange 8 which in turn supports the drive member 52.

In the operation of the axial flux motor drive A, an electric current is directed through the windings 40 and 42 of the stator 38 for the motor 4. It produces a magnetic flux that rotates around the axis X and exerts torque on the magnets of the rotor 44, causing the rotor 44 to revolve about the axis X and along with it the carrier 56 of the transmission 6. The planet clusters 54 orbit about the axis X and rotate about their own axes Y, inasmuch as the planet gear 86 of each cluster 54 engages the stationary ring gear 50. The rotating carrier 56, being engaged with the drive member 52 through the other planet gears 88 of the clusters 54, imparts rotation to the final drive member 52 in the direction of rotation for the carrier 56. But the clusters 54 rotate in the direction that offsets the rotation imparted by the carrier 56 alone. As a consequence, the drive member rotates at a velocity considerably diminished from that of the carrier 56—and the rotor 44 of the motor 4—although the drive member 52 still assumes the direction of rotation of the carrier 56. An increase in torque accompanies the reduction in velocity. Thus, the torque developed at the drive shaft 68 and drive flange 8 exceeds that imparted to the carrier 56 by the axial flux motor 4. The speed ratio F is:

$$F = 1 - [(c \times d) \div (b \times e)]$$

On the other hand, if the stationary ring gear 50 is smaller than the ring gear 60 on the final drive member 52, the final drive member 52 will rotate in the direction opposite to that of the carrier 56.

Despite the presence of the transmission 6 and the amplification of the torque produced by it, the axial flux motor drive A occupies little space along its major axis X of rotation—indeed, generally no more space than the axial flux motor 4 itself.

The axial flux motor 4 may have only a single array 40 or 42 of windings arranged along only one face of the rotor 44. U.S. Pat. No. 6,922,004 discusses the operation of an axial flux motor and is incorporated herein by reference.

The invention claimed is:

1. A drive for imparting rotation about an axis; said drive comprising;
    a housing;
    an axial flux motor located in the housing and including a stator having axially spaced windings and a radially directed rotor that is located between the windings and revolves about the axis; and
    a transmission located within and surrounded by the motor, the transmission including a first ring gear that is fixed in position with respect to the housing, a second ring gear that rotates about the axis, and a carrier that rotates about the axis and is coupled to the rotor of the axial flux motor so that the motor will apply torque to and impart rotation to the carrier, the carrier having spaced apart walls and pins that extend between the walls, the transmission further including planet gear clusters that rotate on the pins of the carrier and orbit about the axis when the carrier rotates, with each cluster having united first and second planet gears that are offset axially from each other, the first planet gear of each cluster being larger than the second planet gear of the cluster and being engaged with the first ring gear, the second planet gear of each cluster being engaged with the second ring gear to drive the second ring gear, a drive spindle connected to the second ring gear, and a drive flange coupled with and driven by the second ring gear through the drive spindle, the drive flange being exposed beyond the housing and including a sleeve that projects into the housing and receives the drive spindle and is coupled with a key or spline to the drive spindle; and
    an antifriction bearing located between the sleeve of the drive flange and the housing.

2. A drive according to claim 1 wherein the carrier has stub shafts which project axially from it along the axis.

3. A drive according to claim 2 wherein one stub shaft projects into and rotates in the housing.

4. A drive according to claim 3 wherein the second ring gear and the drive spindle are on a final drive member, and the other stub shaft of the carrier projects into and rotates in the final drive member.

5. A drive according to claim 1 wherein the antifriction bearing is a double row bearing that is configured to transfer radial loads and also thrust loads in both axial directions.

6. A drive for imparting rotation about a primary axis; said drive comprising:
    a housing;
    an axial flux motor located in the housing and including a stator having axially spaced windings and a radially directed rotor that is located between the windings and revolves about the primary axis; and
    a transmission nested within the motor, the transmission including;
        a first ring gear that is fixed in position with respect to the housing;
        a final drive member that is supported by the housing for rotation about the primary axis and includes a second ring gear; a drive spindle located along the primary axis, and a radial wall connecting the second ring gear and the drive spindle;
        a carrier that rotates about the primary axis and is coupled to the rotor of the axial flux motor so that the motor will apply torque to and impart rotation to the carrier, the carrier having first and second spaced apart end walls along which the carrier is supported on the housing and on the drive member for rotation in the housing and further having pins that extend between the end walls, with the pins having axes that are parallel to the primary axis;

planet gear clusters that are carried by the carrier and orbit about the primary axis and rotate about the axes of the pins when the carrier rotates, with each cluster having united first and second planet gears, the first planet gear of each cluster being engaged with the first ring gear and a second planet gear being engaged with the second ring gear to drive the final drive member;

a drive flange exposed outside the housing and including a sleeve that projects into the housing and receives the drive spindle of the drive member: and a double row antifriction bearing located between the housing and the sleeve of the drive flange.

7. A drive according to claim 6 wherein the antifriction bearing has the capacity to transfer radial loads and axial loads in both axial directions between the drive member and housing.

8. A drive according to claim 6 wherein the pins at their ends are anchored in the end walls of the carrier and the planet clusters rotate about the pins.

9. A drive according to claim 6 wherein the carrier has stub shafts that project axially from its end walls, and the stub shaft on the first end wall projects into another antifriction bearing and is supported by the housing and the stub shaft on the second end wall projects into still another of the antifriction bearings and is supported by the final drive member.

10. A drive accordingly to claim 6 wherein the radial wall of the final drive member is spoked.

11. A drive according to claim 6 wherein the drive member is an integral unit.

12. A drive according to claim 9 wherein the bearings are smaller in diameter than the ring gears.

* * * * *